(12) United States Patent
Bukkems et al.

(10) Patent No.: US 12,492,802 B2
(45) Date of Patent: Dec. 9, 2025

(54) LIGHTING ARRANGEMENT FOR DECORATIVE LIGHTING

(71) Applicant: SIGNIFY HOLDING B.V., Eindhoven (NL)

(72) Inventors: Peter Johannes Martinus Bukkems, Deurne (NL); Erik Paul Boonekamp, Bunnik (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/855,396

(22) PCT Filed: Apr. 4, 2023

(86) PCT No.: PCT/EP2023/058755
§ 371 (c)(1),
(2) Date: Oct. 9, 2024

(87) PCT Pub. No.: WO2023/198508
PCT Pub. Date: Oct. 19, 2023

(65) Prior Publication Data
US 2025/0334249 A1    Oct. 30, 2025

(30) Foreign Application Priority Data

Apr. 12, 2022   (EP) ..................................... 22167798

(51) Int. Cl.
*F21V 5/04*     (2006.01)
*F21V 23/00*    (2015.01)
(Continued)

(52) U.S. Cl.
CPC ............ *F21V 5/043* (2013.01); *F21V 23/003* (2013.01); *F21Y 2107/30* (2016.08);
(Continued)

(58) Field of Classification Search
CPC .... F21V 5/043; F21V 23/003; F21V 2200/00; F21V 2200/10; F21V 2200/13;
(Continued)

(56) References Cited

U.S. PATENT DOCUMENTS 7,210,818 B2 * 5/2007 Luk ........................ H05K 1/189
                                                           362/249.14
2003/0076281 A1   4/2003 Morgan et al.
(Continued)

FOREIGN PATENT DOCUMENTS

CN      103090240 A      5/2013
DE    202012004210 U1    6/2012
(Continued)

*Primary Examiner* — Bao Q Truong

(57) ABSTRACT

A lighting arrangement (100), comprising an optical element (110) in the form of a rod comprising a translucent material, wherein the optical element elongates along a first axis. A. The lighting arrangement further comprises at least one array (120) of light emitting diodes (130). LEDs, wherein each array of the at least one array of LEDs comprises at least two adjacently arranged rows (150) of LEDs. Each row of LEDs comprises sequentially arranged LEDs configured to emit light being of the same color in the row, the color being different to a color of the light configured to be emitted by the LEDs of any of the other rows. Each array of the at least one array of LEDs is arranged on an outer surface (160) of the optical element and arranged in a spiral shape around the optical element.

15 Claims, 4 Drawing Sheets

(51) Int. Cl.
*F21Y 107/30* (2016.01)
*F21Y 109/00* (2016.01)
*F21Y 113/13* (2016.01)
*F21Y 115/10* (2016.01)

(52) U.S. Cl.
CPC ....... *F21Y 2109/00* (2016.08); *F21Y 2113/13* (2016.08); *F21Y 2115/10* (2016.08)

(58) Field of Classification Search
CPC ............. F21Y 2107/30; F21Y 2109/00; F21Y 2113/13; F21Y 2115/10; G02B 6/00; G02B 6/0005; G02B 6/0008
See application file for complete search history.

(56) References Cited

U.S. PATENT DOCUMENTS

| | | |
|---|---|---|
| 2011/0019433 A1 | 1/2011 | Dussault |
| 2013/0094240 A1* | 4/2013 | Boonekamp .............. F21S 8/00 362/559 |
| 2017/0356740 A1 | 12/2017 | Ansari et al. |
| 2020/0191353 A1 | 6/2020 | Heffels et al. |
| 2021/0381675 A1 | 12/2021 | Bretschneider |

FOREIGN PATENT DOCUMENTS

| | | |
|---|---|---|
| EP | 2827046 A1 | 1/2015 |
| WO | 2017151412 A1 | 9/2017 |
| WO | 2017182094 A1 | 10/2017 |

* cited by examiner

LIGHTING ARRANGEMENT FOR DECORATIVE LIGHTING

CROSS-REFERENCE TO PRIOR APPLICATIONS

This application is the U.S. National Phase application under 35 U.S.C. § 371 of International Application No. PCT/EP2023/058755, filed on Apr. 4, 2023, which claims the benefit of European Patent Application No. 22167798.2, filed on Apr. 12, 2022. These applications are hereby incorporated by reference herein.

FIELD OF THE INVENTION

The present invention generally relates to a lighting arrangement for achieving desired lighting effects such as a decorative lighting. More specifically, the present invention is related to a lighting arrangement for achieving a decorative lighting effect via projection on a surface, such as a mimicking of one or more lighting effects occurring in nature.

BACKGROUND OF THE INVENTION

The use of light emitting diodes (LED) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy.

One area of interest for systems or arrangements comprising LEDs is the possibility to generate decorative lighting effects, e.g. on surfaces. More specifically, it may be desirable to mimic one or more lighting effects or lighting phenomena occurring in nature, and project such lighting effects or phenomena on a surface such as a wall. Examples may include a sun rise, a sun set, a rainbow, a horizon, etc.

One of the challenges of mimicking lighting effects or phenomena as exemplified above is to control the light emitted by the systems or arrangements such that a light gradient is generated which is smooth in order to provide resemblance to the lighting effects or phenomena occurring in nature. For example, in case it is desired to create a decorative and/or aesthetically pleasing horizon on a wall or a ceiling via a system or arrangement, it is important to have an arrangement or system which is able to provide a light beam which is tunable vertically, i.e. from top till bottom. Furthermore, in a horizontal direction, i.e. from left to right, it is usually desired to have a fixed pattern or (very) low resolution for a high mimicking fidelity.

Current arrangement or systems in the prior art often suffer from a disability, or at least a limited ability, to create a smooth light gradient as discussed above. Consequently, these arrangements fail to generate a truthful reproduction of lighting effects or phenomena occurring in nature. Furthermore, the prior art arrangements or systems may be relatively complex and/or may require tedious and/or difficult tuning in order to create the desired effect.

Hence, it is an object of the present invention to provide a non-complex and conveniently operable lighting arrangement which is able to provide one or more desired lighting effects, such as a truthful reproduction of one or more lighting effects or phenomena occurring in nature.

SUMMARY OF THE INVENTION

It is of interest to overcome at least some of the deficiencies of current lighting systems or arrangements, and to provide a lighting arrangement which is non-complex in its structure, conveniently operable, and which is able to achieve desirable (decorative) lighting effects, wherein examples of such effects may comprise truthful reproductions of lighting effects and/or phenomena occurring in nature on a surface.

This and other objects are achieved by providing a lighting arrangement having the features in the independent claim. Preferred embodiments are defined in the dependent claims.

Hence, according to the present invention, there is provided a lighting arrangement. The lighting arrangement comprises an optical element in the form of a rod which comprises a translucent material, wherein the optical element elongates along a first axis, A. The lighting arrangement further comprises at least one array of light emitting diodes, LEDs, wherein each array of the at least one array of LEDs comprises at least two adjacently arranged rows of LEDs. Each row of LEDs comprises sequentially arranged LEDs configured to emit light being of the same color in the row, the color being different to a color of the light configured to be emitted by the LEDs of any of the other rows. Each array of the at least one array of LEDs is arranged on an outer surface of the optical element and arranged in a spiral shape around the optical element. The LEDs are arranged to emit said light through the optical element for being influenced, i.e. refracted, by the optical element upon passage of the light through the optical element.

Thus, the present invention is based on the idea of a lighting arrangement with one or more arrays of LEDs arranged in a spiral shape around an optical element. The features of the LEDs and the spiral arrangement and/or distribution of the LEDs around the optical element provides a tunable lighting arrangement. The lighting arrangement may hereby achieve a projection of the emitted light from the LEDs on a surface such as a wall, allowing tuning with the sharp cut and/or color of the light emitted by the LEDs. The light emitted from the lighting arrangement may achieve a smooth light gradient, which in turn may achieve desirable (decorative) lighting effects. For example, the lighting arrangement may be configured to reproduce one or more lighting effects or phenomena occurring in nature in a truthful way, such as a sun rise, a sun set, a horizon, etc.

The present invention is advantageous in that the lighting arrangement may provide aesthetically pleasing and/or decorative lighting effects in a convenient manner.

The present invention is advantageous in its ability to provide (a) smooth light gradient(s) by the features of the LEDs and their arrangement or distribution on the optical element, which augments the possibility to reproduce desirable lighting effects, such as lighting effects or phenomena occurring in nature.

The present invention is further advantageous by its non-complexity in that complex tuning operations in order to create a desired lighting effect may be mitigated, or even completely avoided. More specifically, as current arrangement or systems in the prior art may require tedious and/or difficult tunings, e.g. of complex optical arrangements, in order to create desired lighting effects, they often suffer from a disability, or at least a limited ability, to efficiently and conveniently create desired and/or truthful lighting effects. The present invention, on the other hand, overcomes these disadvantages.

There is provided a lighting arrangement which comprises an optical element in the form of a rod which comprises a translucent material. By "optical element", it is here meant substantially any element which is able to at least partially influence light. In the context of the invention, the expression "influence light" is to be understood to redirect by refraction a light ray into a specific (desired) direction. By the term "optical element in the form of a rod", it is meant that the optical element constitutes a solid element in the form of an bar, pole, or the like. By "translucent material", it is here meant that the material of the optical element permits a passage of light without significant diffusing the light, i.e. the degree of diffusion is 10% or less (meaning that the original beam angle is increased by the optical element by no more than 10%), also referred to as "transparent material". Preferably the degree of diffusion by the optical element is 5% or less, such as 2%, most preferably the degree of diffusion is essentially absent, i.e. 0%. The optical element elongates along a first axis, A. Hence, the optical element has an oblong and/or elongated shape, which extends along a (principal) first axis, A.

The lighting arrangement further comprises at least one array of light emitting diodes, LEDs. By the term "array", it is meant, in this context, a grouping or arrangement of LEDs, e.g. a (sequential) arrangement of LEDs in one or more dimensions. Each array of the at least one array of LEDs comprises at least two adjacently arranged rows of LEDs. By the term "row", it is here meant LEDs arranged in sequence, i.e. after one another. Each row of LEDs comprises sequentially arranged LEDs configured to emit light being of the same color in the row, the color being different to a color of the light configured to be emitted by the LEDs of any of the other rows. In other words, the LEDs of any row is configured to emit light of a (individual) color, such that LEDs of n rows are configured to emit n colors. Each array of the at least one array of LEDs is arranged on an outer surface of the optical element and arranged in a spiral shape around the optical element. Hence, the one or more arrays of LEDs is (are) arranged on the optical element's outer surface such that the array(s) form(s) spiral(s) around the first (principal) axis, A, of the optical element. In other words, the LED array(s) are spirally wound around the optical element and the LEDs face towards the outer surface of the optical element such that essentially each LED emits a respective beam of light with an average or main emission in a direction towards the outer surface of the optical element (wherein said direction is substantially perpendicular or perpendicular to said outer surface), subsequently essentially all said light enters into the optical component. In short, the LEDs are mounted on the outer surface of the optical element, face toward the optical element, and have their main emission direction towards (and subsequently into) the optical element.

According to an embodiment of the present invention, the LEDs may be configured to project the emitted light in a first direction, B, perpendicular to the first axis, A. Hence, the LEDs of the lighting arrangement may be arranged or configured to project the emitted light perpendicular to the first axis, A, of the optical element.

According to an embodiment of the present invention, neighboring LEDs of each row of LEDs may be arranged offset with respect to each other in a second direction, D, parallel to the first axis, A, and in a circumferential direction, C, of the optical element, perpendicular to the first axis, A, whilst the projections of the widths, $w_i$, of the LEDs, defined in the circumferential direction, C, on a second axis, F, perpendicular to the first axis, A, and perpendicular to a first direction, B, perpendicular to the first axis, A, overlap. Hence, neighboring LEDs are arranged offset (i.e. shifted) both in the second direction, D, as well as in the circumferential direction, C. The offset (shift) in the circumferential direction, C, is dependent on the widths, $w_i$, of the LEDs, such that there is an overlap of the projections of the widths, $w_i$, of the LEDs, defined in the circumferential direction, C, on the second axis, F. In other words, there is an overlap of light beams from the LEDs on the second axis, F, as a result of the selected offset between neighboring LEDs. The embodiment is advantageous in that (relatively) dark areas may be prevented upon projection of the light from the lighting arrangement. For example, in case the lighting arrangement is arranged in a horizontal direction, i.e. that the first axis, A, is parallel to a horizontal direction, (relatively) dark areas may be prevented in a (vertical) direction upon projection of the light emitted from the lighting arrangement, such as on a vertical surface.

According to an embodiment of the present invention, the optical element may have a cylinder shape, which typically has an oval or circular in cross section perpendicular to the first axis A. The embodiment is advantageous in that the array(s) and/or rows of LEDs may be conveniently arranged (e.g. symmetrically arranged) on the cylinder-shaped optical element in order to achieve the desired lighting effect from the lighting arrangement upon arrangement.

According to an embodiment of the present invention, the diameter, d, of the rod may be within the range 20 mm<=d<=30 mm. It will be appreciated that a relatively small diameter of the rod may negatively affect the ability of the lighting arrangement to provide the desired lighting effect, whereas a relatively large diameter may have a negative impact on cost. Hence, the present embodiment is advantageous in that it may be able to create a desirable light effect as described previously whilst being cost-efficient.

According to an embodiment of the present invention, the lighting arrangement may further comprise at least one of at least one printed circuit board, PCB, and at least one LED strip, arranged to support the at least one array of LEDs. Hence, the lighting arrangement may comprise one or more PCBs and/or one or more LED strips which are at least partially wound around the optical element, wherein the PCB(s) and LED strip(s) is (are) arranged to mechanically and/or electrically support the array(s) of LEDs.

According to an embodiment of the present invention, at least one array of the at least one array of LEDs may be arranged from a first end portion of the optical element to a second end portion of the optical element, oppositely arranged the first end portion. Hence, the LED array(s) elongate from a (first) end portion to an oppositely arranged (second) portion of the optical element. The embodiment is advantageous in that the (entire) length of the optical element may be used for the spiral-shaped array(s) of LEDs.

According to an embodiment of the present invention, at least one array of the at least one array may elongate at least 120° in a circumferential direction, C, of the optical element, perpendicular to the first axis, A. Hence, the array(s) of LEDs may be arranged in a spiral shape around the optical element at least ⅓ of the circumferential direction, C, of the optical element. The embodiment is advantageous in that it increases the ability to create the desired lighting effect. The lighting effect and/or image as achieved/created on the surface may be dependent on numerous factors, e.g. the inclination (pitch) of the LED array spiral with respect to the first axis, A (wherein the inclination/pitch is indicated by the angle α), the diameter, d, of the optical element, the colors of the light of the rows of LEDs, etc. Typically, the inclination, i.e. angle α, is in the range of 1°<=α<=20°, preferably 2°<=α<=10°.

According to an embodiment of the present invention, the lighting arrangement may further comprise an optical foil arranged between the at least one array of LEDs and the optical element. By the term "foil", it is here meant substantially any thin material, such as a sheet or the like. The embodiment is advantageous in that it may increase the control of the light and/or limit (the) width(s) of spots upon projection of the emitted light from the lighting arrangement. In turn, the embodiment may lead to an even more ameliorated lighting effect.

According to an embodiment of the present invention, the projections of the widths, $WS_i$, of the arrays of LEDs, defined in the circumferential direction, C, on a second axis, F, perpendicular to the first axis, A, and perpendicular to a first direction, B, perpendicular to the first axis, A, overlap. Hence, each (spiral-shaped) array of LEDs has a respective width, $WS_i$, defined in the circumferential direction, C, and upon projection of the widths, $WS_i$, of the arrays of LEDs, on the second axis, F, wherein the second axis, F, is perpendicular to the first axis, A, as well as the first direction, B, there is an overlap of the (projected) widths, $WS_i$. The embodiment is advantageous in that there may be a continuous projection of the emitted light from the lighting arrangement on the second axis, F, such that the occurrence of (relatively) dark areas may be avoided.

According to an embodiment of the present invention, the LEDs may comprise high-brightness LEDs each arranged to emit light with a brightness of at least 30 lm. The embodiment is advantageous in that the ability to maintain a (moving) light effect upon projection of the light is even further improved. For example, in case of a horizontal orientation of the lighting arrangement for a projection of light on a vertically arranged surface, a desired (moving) light effect may be maintained as every (single) LED substantially is configured to project a horizontal line on the surface.

According to an embodiment of the present invention, the LEDs may comprise RGB LEDs. Hence, the LEDs may comprise multi-color LEDs of red-green-blue (RGB) type.

According to an embodiment of the present invention, there is provided a lighting unit. The lighting unit may comprise a lighting arrangement according to one or more of the preceding embodiments, and a control unit coupled to the LEDs and configured to control at least one property of the emitted light. By "control unit", it is here meant substantially any automatic or manually operable unit, device, arrangement, or the like, which is coupled or connected to the LEDs of the lighting arrangement for control of one or more (level of) properties of the emitted light. By the term "property of the emitted light", it is here meant substantially any light property such as color, brightness, intensity, etc. Furthermore, the control unit may be configured to control the property(ies) of the emitted light as a function of time. The present embodiment is advantageous in that the control unit may control the optical property level(s) in various ways, which consequently may achieve an even more ameliorated light output (e.g. light beam(s) or gradient) from the lighting arrangement of the lighting unit. Consequently, the embodiment of the lighting unit is advantageous in that it may efficiently and conveniently achieve a desired lighting effect via the control unit thereof.

According to an embodiment of the present invention, there is provided a lighting system. The lighting system comprises a surface extending in a plane, P. The lighting system further comprises a lighting arrangement according to any one of the previously described embodiments, wherein the lighting arrangement is arranged with respect to the surface such that the first axis, A, is perpendicular to a normal, N, of the plane, P, and wherein the lighting arrangement is arranged to project the emitted light on the surface. Hence, the lighting arrangement of the lighting system may be arranged on a (predetermined (selected) or arbitrary) distance from the surface, and the lighting arrangement is arranged parallel to the surface. Upon operation of the lighting arrangement, the array(s) of the LEDs is (are) arranged or configured to project the light in a direction perpendicular to the first axis, A (i.e. parallel to the normal, N, of the plane, P) such that the light is projected onto the surface of the lighting system.

According to an embodiment of the present invention, the surface extends in a vertical plane, $P_v$, and the lighting arrangement is arranged such that the first axis, A, is parallel to a horizontal direction. Hence, the present embodiment encompasses a vertically arranged surface (e.g. a vertical wall) and a horizontally arranged lighting arrangement, wherein the lighting arrangement is arranged to project the emitted light of the vertical surface.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
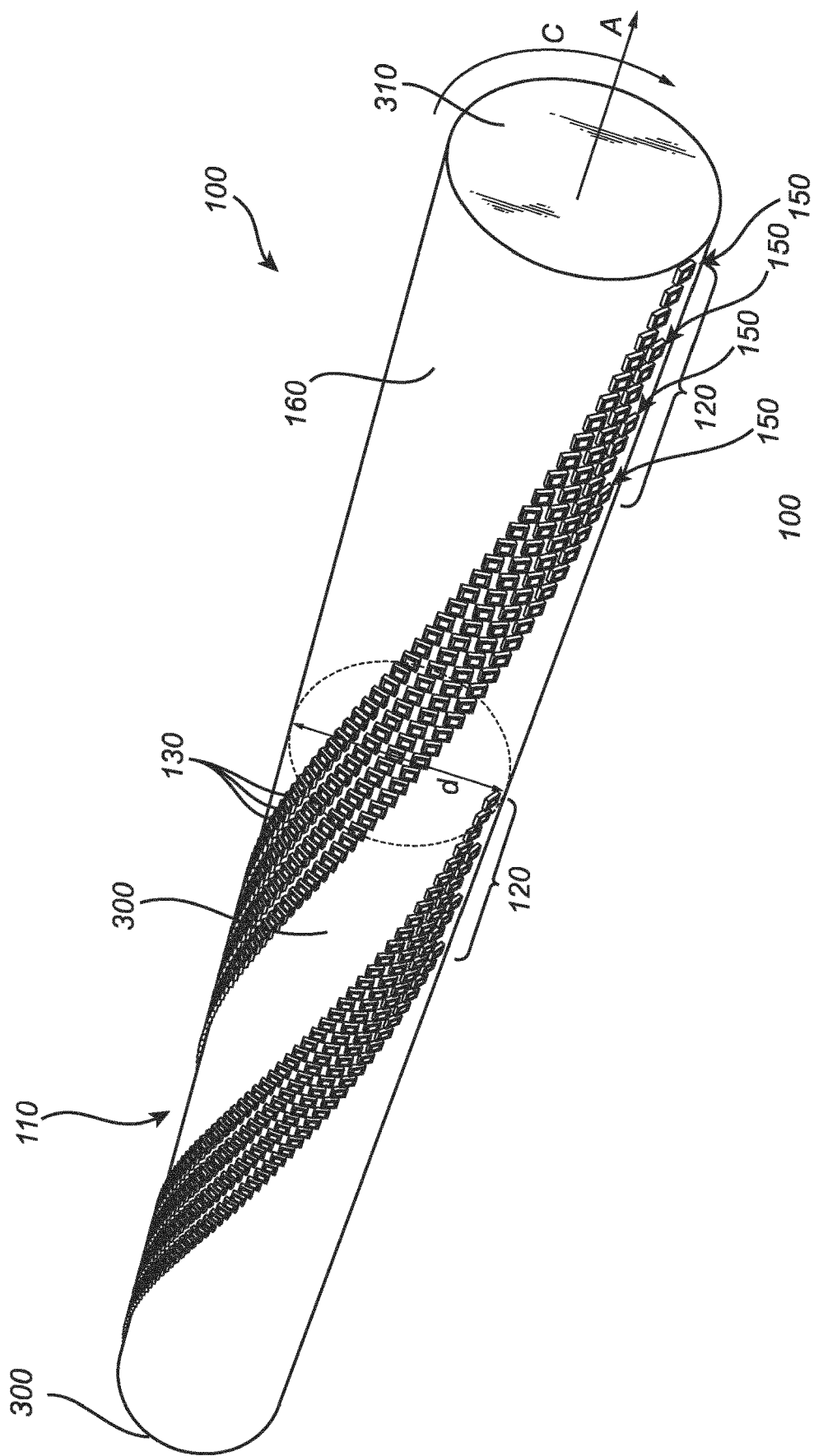
FIG. 1 schematically shows a lighting arrangement according to an exemplifying embodiment of the present invention, FIG. 2 schematically shows a portion of a lighting arrangement according to an exemplifying embodiment of the present invention, and FIG. 3a, FIG. 3b and FIG. 4 schematically show lighting systems according to exemplifying embodiments of the present invention.

FIG. 1 schematically shows a lighting arrangement 100 according to an exemplifying embodiment of the present invention. The lighting arrangement 100 comprises an optical element 110 which comprises a translucent material having a degree of diffusion of less than 3%. The optical element 110 elongates along a first axis, A. The optical element 110 is exemplified in FIG. 1 as a (solid, rod-shaped) cylinder with a circular cross-section with diameter, d, but it should be noted that the optical element 110 may have alternative shapes and/or cross-sections than that (those) shown. The optical element 110 has an oblong and/or elongated shape, which extends along the (principal) first axis, A. In case of the optical element 110 as exemplified in FIG. 1, its diameter, d, may be within the range 20 mm<d<30 mm.

The lighting arrangement 100 further comprises at least one array 120 of light emitting diodes, LEDs 130. For example, the LEDs 130 may comprise, or constitute, RGB LEDs. The lighting arrangement 100 as exemplified comprises two arrays 120 of LEDs 130, but the lighting arrangement 100 may comprise an arbitrary number of arrays 120 of LEDs 130 (even including a single array 120 of LEDs 130).

Each array 120 of the at least one array 120 of LEDs 130 comprises at least two adjacently arranged rows 150 of LEDs 130. Each array 120 of LEDs 130 of the lighting arrangement 100 as exemplified comprises four rows 150 of LEDs 130, but it should be noted that the lighting arrangement 100 may comprise substantially any number (plurality) of rows 150 of LEDs 130.

Each row 150 of LEDs 130 comprises sequentially arranged LEDs 130 configured to emit light being of the same color in the row, the color being different to a color of the light configured to be emitted by the LEDs 130 of any of the other rows 150. In other words, the LEDs 130 of any row 150 is configured to emit light of a (individual) color, such that LEDs 130 of n rows 150 are configured to emit n colors. For example, as shown in FIG. 1, the LEDs 130 of the n=4 rows 150 may be configured to emit n=4 colors, such as e.g. yellow (by the LEDs 130 of row 1), blue (by the LEDs 130 row 2), green (by the LEDs 130 row 3), red (by the LEDs 130 row 4).

Each array 120 of the array(s) 120 of LEDs 130 is arranged on an outer surface 160 of the optical element 110. According to the example in FIG. 1, the cylinder-shaped optical element 110 has a curved outer surface upon which the arrays 120 of LEDs 130 are arranged. The arrays 120 of LEDs 130 are arranged in a spiral shape around the optical element 110 on the outer surface 160 of the optical element 110, face the optical element 110, and have a respective main emission direction towards the first axis A and into the optical element 110 (see FIG. 3b). Hence, the arrays 120 of LEDs 130 are arranged on (i.e. wound on) the optical element's 110 outer surface such that the arrays 120 form spirals in the circumferential direction, C, and around the first (principal) axis, A, of the optical element 110. The arrays 120 of LEDs 130 may be arranged from a first end portion 300 of the optical element 110 to a second end portion 310 of the optical element 110, oppositely arranged the first end portion 300. The arrays 120 of LEDs 130 may elongate at least 120° in the circumferential direction, C, of the optical element 110.

It should be noted that the lighting arrangement 100 may comprise curved (micro) LEDs and/or (mini) LED systems, e.g. with display options.

The lighting arrangement 100 may further comprise one or more printed circuit boards, PCBs, (not shown) and/or one or more LED strips (not shown), wherein the PCB(s) and/or LED strip(s) is (are) configured to (mechanically and/or electrically) support the LEDs 130.

Figure 2:
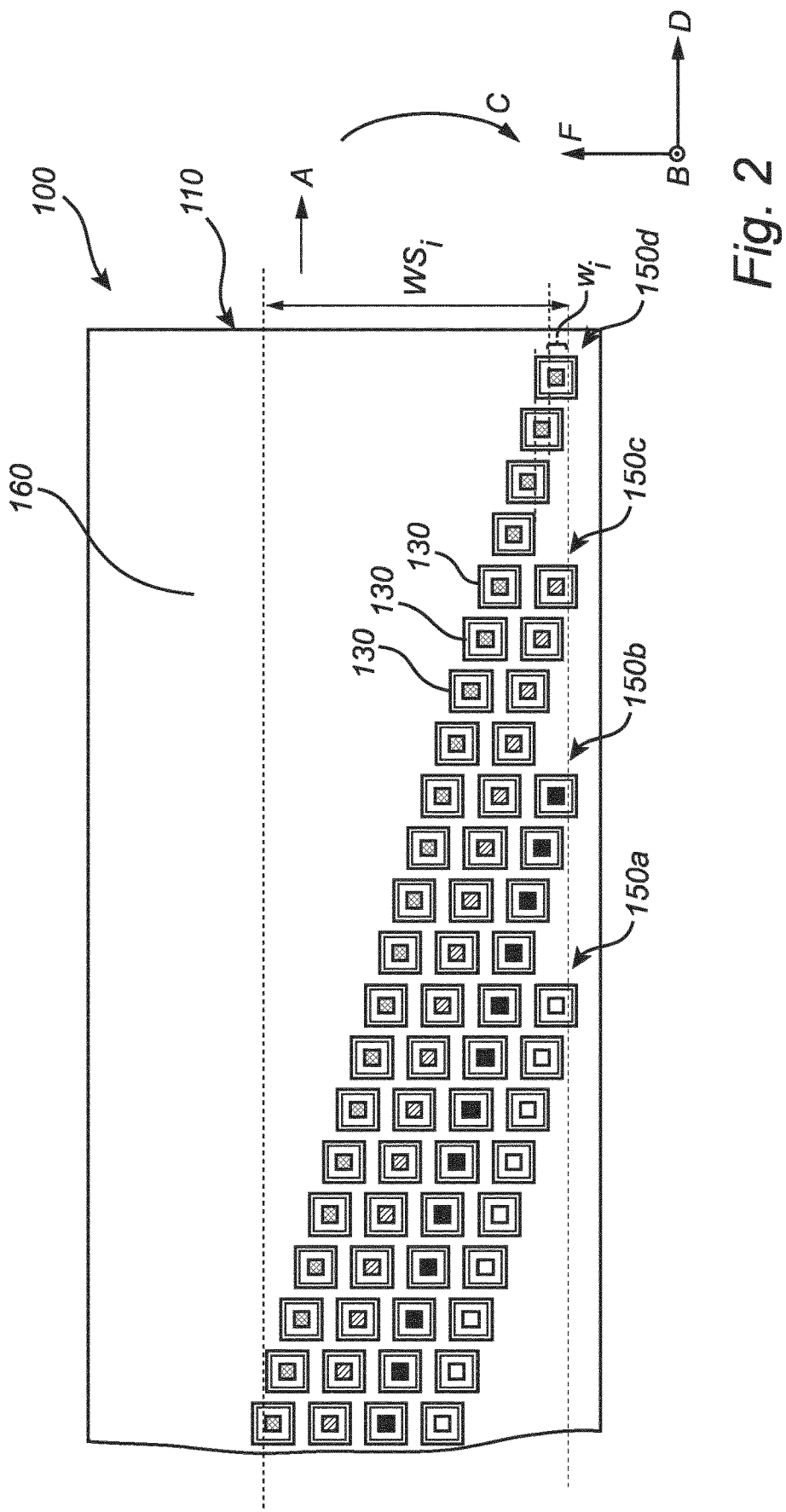

FIG. 2 schematically shows a portion of the lighting arrangement 100 as described by FIG. 1 and the associated text, and it is hereby referred to FIG. 1 and the associated text for an increased understanding. Here, the lighting arrangement 100 is depicted with a "flat" optical element 110 for an easier understanding, but it should be noted that the optical element 110 in FIG. 2 may have the same (cylinder) shape as the optical element 110 in FIG. 1. A single array 120 of LEDs 130 is shown in FIG. 2 for reasons of simplicity. Neighboring LEDs 130 of each row 150 of LEDs 130 are arranged offset with respect to each other on the outer surface 160 of the optical element 110. Here, the LEDs 130 are exemplified as having a quadratic cross-section, but it should be noted that the LEDs 130 may take on substantially any other shape. The offset or shift between the neighboring LEDs 130 is in a second direction, D, parallel to the first axis, A, as well as in a circumferential direction, C, of the optical element 110, perpendicular to the first axis, A. Each LED 130 has a width, $w_i$, defined in the circumferential direction, C, of the optical element 110. The projections of the widths, $w_i$, of the LEDs 130, defined in the circumferential direction, C, on a second axis, F, wherein the second axis, F, is perpendicular to the first axis, A, and perpendicular to the first direction, B, overlap, as indicated with the aid of the dashed lines. Hence, upon projection of the emitted light from the LEDs 130 of the lighting arrangement 100 in the first direction, B, perpendicular to the first axis, A, there is a continuous light distribution from the lighting arrangement 100 in the direction of the second axis, F. The spiral shape of the optical element 110 enables the overlap, which in turn enables the possibility to pixelate along the second axis, F, (which may represent a dimension of a surface such as a wall) in a very detailed manner along the second axis, F (and a low resolution/pixelation in the second (e.g. horizontal) direction, D, due to the relatively long spiral shape of the optical element 110). According to an example, the projections of the widths, $WS_i$, of the arrays 120 of LEDs 130, defined in the circumferential direction, C, on the second axis, F, perpendicular to the first axis, A, and perpendicular to the first direction, B, may overlap.

Analogously with FIG. 1, the lighting arrangement 100 comprises n=4 rows 150a-d of LEDs 130 configured to emit n=4 colors, such as e.g. yellow 150a, blue 150b, green 150c, red 150d.

Figure 3A:
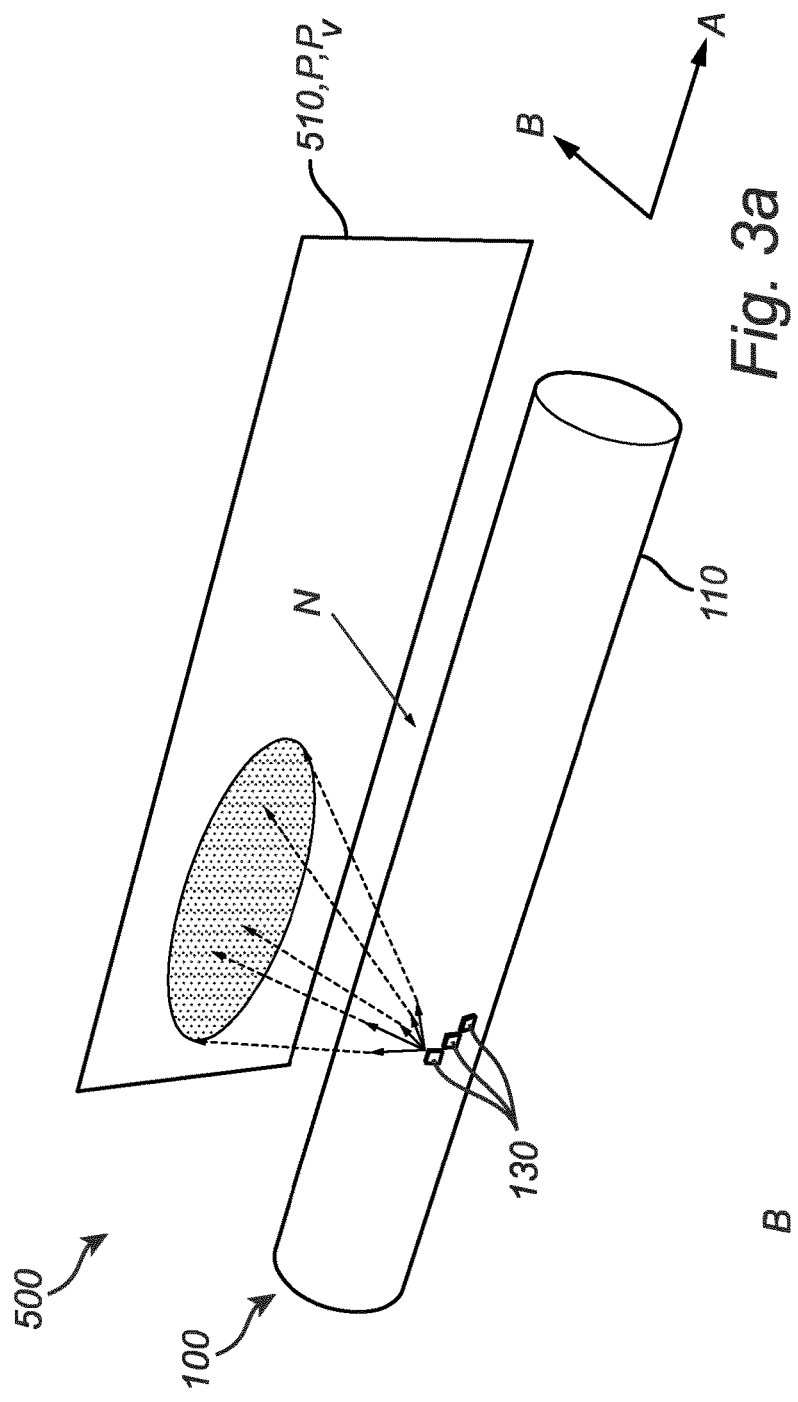
Figure 3B:
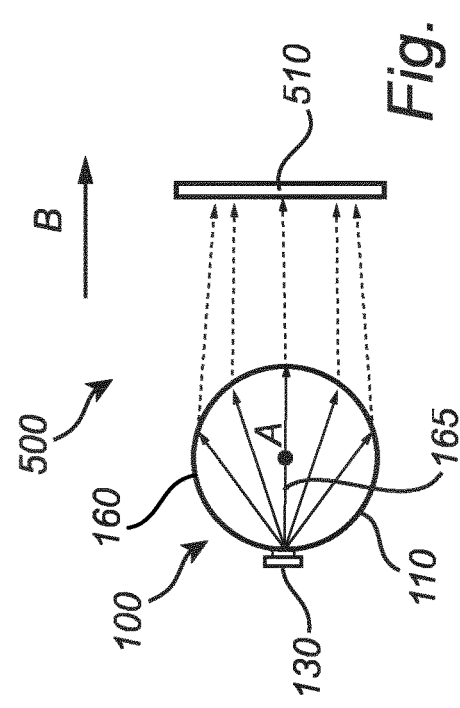

FIGS. 3a and 3b schematically show a lighting system 500 according to an exemplifying embodiment of the present invention. The lighting system 500 comprises a lighting arrangement 100 according to any one of the previously described examples, but it should be noted that elements and/or features of the lighting arrangement 100 have been omitted compared to the lighting arrangement 100 of FIG. 1, as the purpose of FIG. 3a is to describe the emission of light from the lighting arrangement 100. Hence, it is also referred to FIG. 1 and/or FIG. 2 and the associated text(s) for an increased understanding of the features and/or functioning of the lighting arrangement 100.

In FIG. 3a, the lighting system 500 comprises a surface 510 extending in a plane, P. For example, the surface 510 may extend in a vertical plane, $P_v$, and the lighting arrangement 100 may be arranged such that the first axis, A, is parallel to a horizontal direction. Here, the surface 510 is exemplified as a (portion of a) wall which is arranged vertically, but it should be noted that the surface 510 may constitute substantially any surface 510, e.g. a ceiling. In FIG. 3a, for reasons of simplicity, only three LEDs 130 of the lighting arrangement 100 are shown. The light from the LEDs 130 during operation of the lighting arrangement 100 of the system 500 is influenced by the optical element 110, refracting the light. The resulting light is (substantially) emitted in a first direction, B, perpendicular to the first axis, A, onto the surface 510, for generating a lighting effect. More specifically, the light from the LEDs 130 is projected on the surface 510, resulting in spots on the surface 510 which constitute the lighting effect, e.g. in form of a sunrise or sunset.

FIG. 3b schematically shows a lighting system 500, wherein the lighting arrangement 100 in shown in the direction of the first axis, A, thereof. For reasons of simplicity, only a single LED 130 of the lighting arrangement 100 is shown. As shown clearly, the light emitted from the LED 130 has a main emission 165 directed to the optical element 110 substantially in a direction B perpendicular to the first axis A, and said light subsequently passes through the optical element 110. Upon passing of said light through the optical element 110 of the lighting arrangement 100, the light emitted from the LED 130 is influenced, i.e. refracted, at the outer surface 160 of the optical element, whereby the light is coupled out of the optical element (rod) 110 transverse to the first axis, A, (wherein the outcoupled light is collimated in the direction transverse to the first axis, A, and uncollimated along the first axis, A) to be projected on the surface (ceiling/wall) 510 of the lighting system 510.

Figure 4:
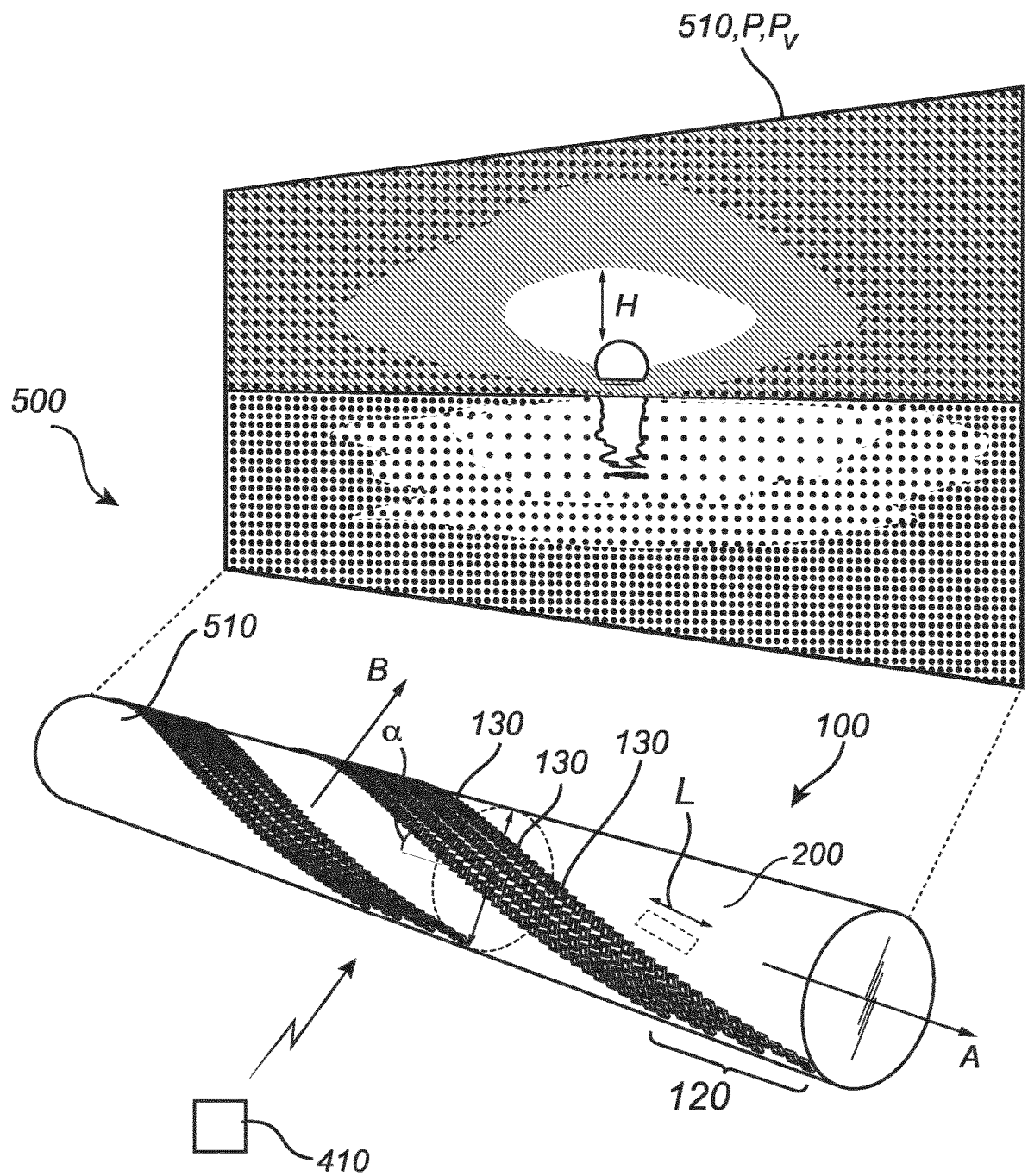

FIG. 4 discloses a lighting system 500 according to an exemplifying embodiment of the present invention. The lighting system 500 comprises a lighting arrangement 100 according to any one of the previously described examples. Hence, it is also referred to any one of FIGS. 1-3 and the associated text(s) for an increased understanding of the features and/or functioning of the lighting arrangement 100. The lighting system 500 further comprises a surface 510 extending in a plane, P. For example, the surface 510 may extend in a vertical plane, $P_v$, and the lighting arrangement 100 may be arranged such that the first axis, A, is parallel to a horizontal direction. Here, the surface 510 is exemplified as a (portion of a) wall which is arranged vertically, but it should be noted that the surface 510 may constitute substantially any surface 510, e.g. a ceiling.

By the lighting arrangement 100 as described by FIG. 1 and the associated text, the light from the array(s) 120 of LEDs 130 during operation of the lighting arrangement 100 of the system 500 may be emitted in a first direction, B, perpendicular to the first axis, A, and projected onto the surface 510. In other words, via the arrangement of the array(s) 120 of LEDs 130 provided around the optical element 110, the light from the array(s) 120 of LEDs 130 projects horizontal spots on the surface 510, which yields a lighting effect in the form of an image (exemplified as a sunset) on the surface 510. The lighting effect and/or image as achieved/created on the surface 510 may be dependent on numerous factors, e.g. the inclination (pitch) of the LED array 120 spiral with respect to the first axis, A (wherein the inclination/pitch is indicated by the angle $\alpha$), the diameter, d, of the optical element 110, the colors of the light of the rows 150 of LEDs 130, etc. For example, an (arbitrarily chosen) first section 200 of a row 150 of LEDs 130 (in FIG. 4, the section 200 is "shifted" with respect to the array 120 of LEDs 130 for reasons of clarity) projects the emitted light of the LEDs 130 thereof, in the first direction, B, and onto the surface 510. For an increased understanding, the length, L, of the first section 200 maps (projects) to a height, H, on the surface 510, wherein $H=L\cdot\sin(\alpha)$. It should be noted that the offset arrangement of the LEDs 130 may be dependent on the inclination (pitch), $\alpha$, of the LED array 120 spiral with respect to the first axis, A. The inclination, $\alpha$, typically being in the range of $1°<=\alpha<=20°$, preferably $2°<=\alpha<=10°$. According to an example, a second section (or the first section 200) of a row 150 of LEDs 130 may project the emitted light, in the first direction, B, onto the surface 510. For example, if the second section is chosen to comprise LEDs 130 which are configured to emit relatively bright light (e.g. on or more high-brightness LEDs 130), the lighting effect achieved on the surface 510 may be a mimicking of a sun or moon.

A control unit 410 may be coupled to the lighting arrangement 110 for (individually) controlling one or more properties of the light emitted from the LEDs 130, which is exemplified in FIG. 4. The control of the property(ies) of the light as achieved by the control unit 410 may provide a light effect (e.g. a mimicked sun or moon), which furthermore may be moved. The light effect may be moved independently of a background light effect achieved by the lighting arrangement 100. The control unit 410 may be configured to control the array(s) 120 of LEDs 130 and/or the rows 150 of LEDs 130 and/or even individual LEDs 130, e.g. to mimic the sun or the moon. For example, in case of individual LED operation by the control unit 410, the control unit 410 may be configured to operate based on one or more algorithms.

The person skilled in the art realizes that the present invention by no means is limited to the preferred embodiments described above. On the contrary, many modifications and variations are possible within the scope of the appended claims. For example, the shape of the optical element 110, the number of arrays 120 of LEDs 130, the number of rows 150 of LEDs 130, etc., may be different than that (those) shown.

The invention claimed is:

1. A lighting arrangement, comprising:
   an optical element in the form of a rod comprising a translucent material, wherein the optical element elongates along a first axis, A, and
   at least one array of light emitting diodes, LEDs,
   wherein each array of the at least one array of LEDs comprises at least two adjacently arranged rows of LEDs, wherein each row of LEDs comprises sequentially arranged LEDs configured to emit light being of the same color in the row, the color being different to a color of the light configured to be emitted by the LEDs of any of the other rows,
   wherein each array of the at least one array of LEDs is arranged on an outer surface of the optical element and arranged in a spiral shape around the optical element, and
   wherein the LEDs face toward the optical element are arranged to emit said light through the optical element for being influenced by the optical element upon passage of the light through the optical element.

2. The lighting arrangement according to claim 1, wherein the LEDs are configured to project the emitted light in a first direction, B, perpendicular to the first axis, A.

3. The lighting arrangement of claim 1, wherein neighboring LEDs of each row of LEDs are arranged offset with respect to each other in a second direction, D, parallel to the first axis, A, and in a circumferential direction, C, of the optical element, perpendicular to the first axis, A, whilst the projections of the widths, $w_i$, of the LEDs, defined in the circumferential direction, C, on a second axis, F, perpendicular to the first axis, A, and perpendicular to a first direction, B, perpendicular to the first axis, A, overlap.

4. The lighting arrangement of claim 1, wherein the optical element has a cylinder shape, circular in cross section perpendicular to the first axis, A.

5. The lighting arrangement of claim 4, wherein the diameter, d, of the rod is within the range 20 mm<d<30 mm.

6. The lighting arrangement of claim 1, further comprising at least one of:
   at least one printed circuit board, PCB, and
   at least one LED strip,
   arranged to support the at least one array of LEDs.

7. The lighting arrangement of claim 1, wherein at least one array of the at least one array is arranged from a first end portion of the optical element to a second end portion of the optical element, oppositely arranged the first end portion.

8. The lighting arrangement of claim 1, wherein at least one array of the at least one array elongates at least 120° in a circumferential direction, C, of the optical element, perpendicular to the first axis, A.

9. The lighting arrangement of claim 1, further comprising an optical foil arranged between the at least one array of LEDs and the optical element.

10. The lighting arrangement of claim 1, wherein the projections of the widths, $WS_i$, of the arrays of LEDs, defined in the circumferential direction, C, on a second axis, F, perpendicular to the first axis, A, and perpendicular to a first direction, B, perpendicular to the first axis, A, overlap.

11. The lighting arrangement of claim 1, wherein the LEDs comprise high-brightness LEDs each arranged to emit light with a brightness of at least 30 lm.

12. The lighting arrangement of claim 1, wherein the LEDs comprise RGB LEDs.

13. A lighting unit, comprising
  the lighting arrangement of claim 1, and
  a control unit coupled to the LEDs and configured to control at least one property of the emitted light from the lighting arrangement.

14. A lighting system, comprising
  a surface extending in a plane, P, and
  the lighting arrangement of claim 1, wherein the lighting arrangement is arranged with respect to the surface such that the first axis, A, is perpendicular to a normal, N, of the plane, P, and wherein the lighting arrangement is arranged to project the emitted light on the surface.

15. The lighting system according to claim 14, wherein the surface extends in a vertical plane, $P_v$, and the lighting arrangement is arranged such that the first axis, A, is parallel to a horizontal direction.

* * * * *